Dec. 15, 1959  H. L. WIEGAND  2,917,685
RECIRCULATING WATER SYSTEM FOR COOLING ELECTRICAL COMPONENTS
Filed July 1, 1957  2 Sheets-Sheet 1
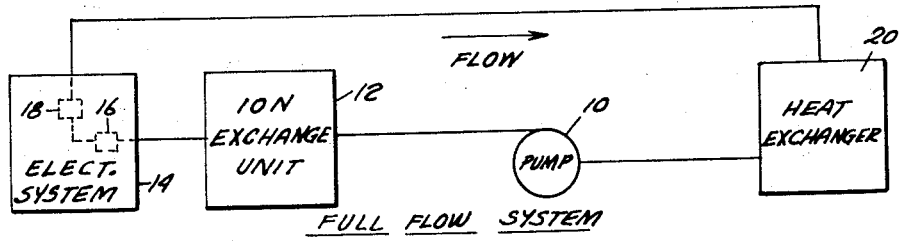
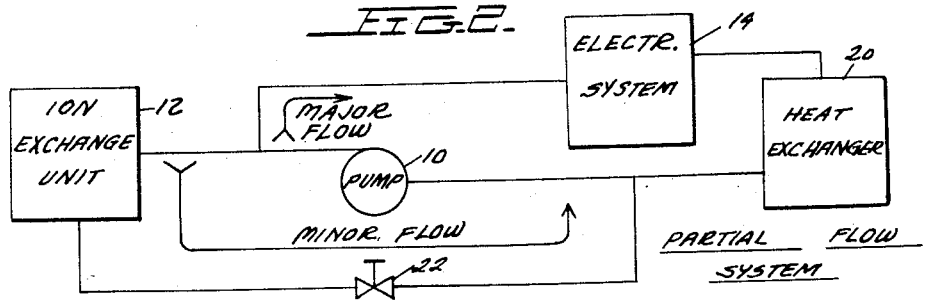
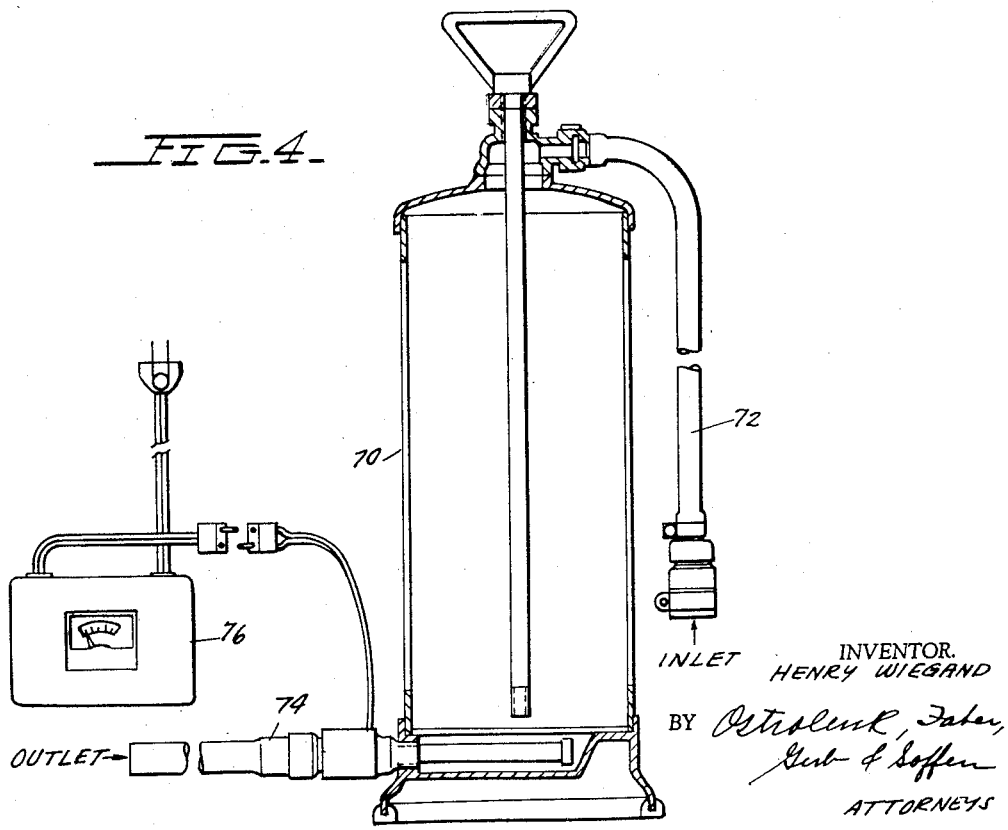
INVENTOR.
HENRY WIEGAND
BY
ATTORNEYS

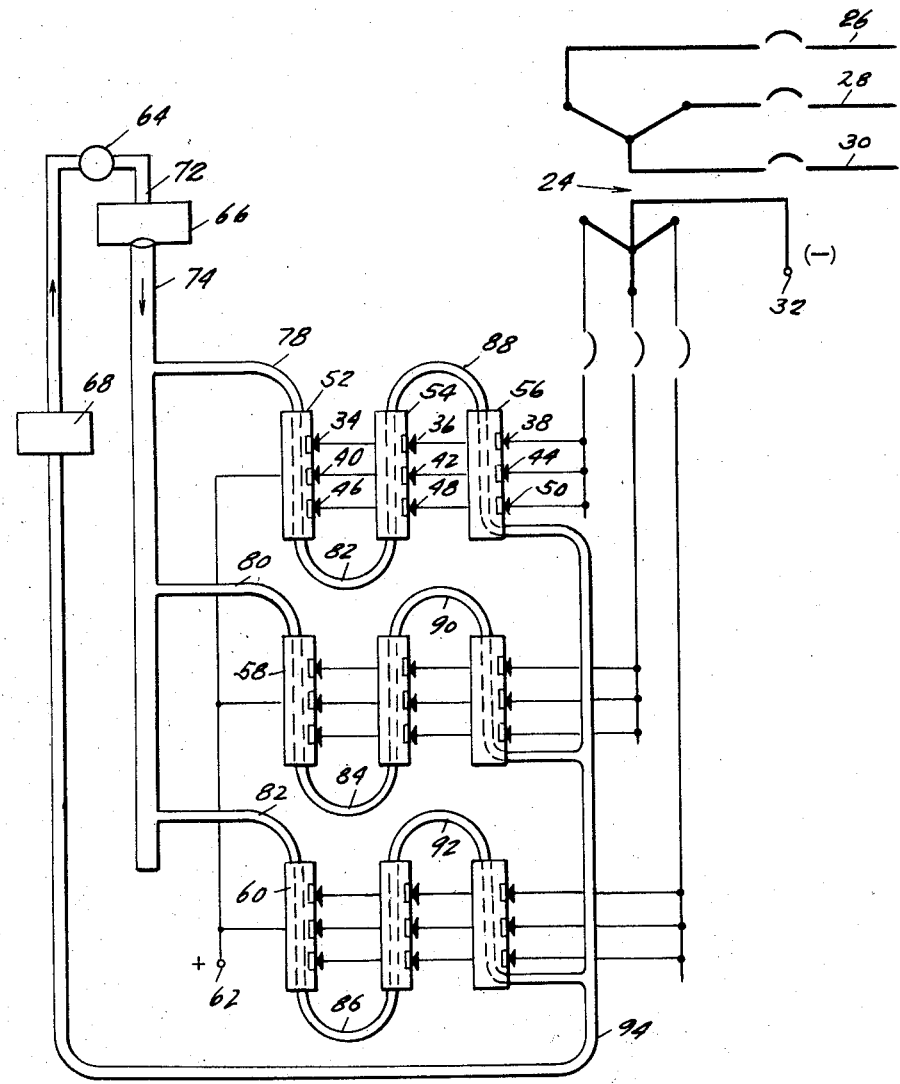

United States Patent Office 2,917,685
Patented Dec. 15, 1959

2,917,685

RECIRCULATING WATER SYSTEM FOR COOLING ELECTRICAL COMPONENTS

Henry L. Wiegand, Philadelphia, Pa., assignor to I-T-E Circuit Breaker Company, Philadelphia, Pa., a corporation of Pennsylvania Application July 1, 1957, Serial No. 668,955

5 Claims. (Cl. 317—234)

My invention relates to a closed cooling system using water as a cooling medium for cooling electrical components at different potentials, and more specifically relates to the use of an ion exchanger in the closed system which maintains the water at an extremely high resistivity.

Cooling of electrical components at different potentials by a fluid means is very desirable in view of the high thermal conductivity of the various types of fluids. Since, however, the fluid will complete a circuit between components at different potentials, it is necessary that this fluid have a high resistivity so as to prevent short circuiting of the components or a substantial current flow therebetween.

In the past various oils have been utilized since they offer the desired high resistivity, but an oil cooling medium is unsatisfactory because of the fire hazard presented thereby, as well as high costs and requirement of special insulating materials due to chemical reaction between the oil and its conducting passages. Clearly, it is far more desirable to use water as a cooling medium, first, because its thermal conductivity is considerably greater than that of oil, and secondly, because of economy and ease of handling.

Water as a cooling medium for electrical systems is widely used in the open type of system wherein fresh water is constantly supplied, and after circulating through the electrical equipment is discharged from the system. This open type of system, however, presents certain difficulties of maintenance and may be very expensive. Furthermore, the resistivity of fresh water is in some cases not sufficiently high to insulate between components of different potentials. That is to say, where the potentials are sufficiently high appreciable stray current may flow through the water path, it being noted that the average resistivity of normal drinking water is approximately 10,000 ohms per cubic centimeter.

When it is attempted to use a cooling system wherein water is recirculated, the mineral content of the water increases and its resistivity rapidly decreases, reaching values as low as 100 ohms per cubic centimeter. In such a system the current flowing through the water produces electrolytic corrosion of the metal parts resulting in a destruction of the cooling unit as well as a short circuit between components of different potentials.

One attempt to utilize recirculated water as a cooling medium for electrical components uses distilled water wherein the water is continuously distilled so as to maintain a moderate resistivity of 50,000 ohms per cubic centimeter. While this type of system may be used in certain applications, it is clear that it is an expensive system requiring complex components subject to appreciable maintenance.

The principle of my invention is to utilize an ion exchanger in conjunction with a recirculating water cooling system wherein the resistivity of the water is maintained at values as high as 13 megohms per centimeter cube at 20° C.

As is well known in the art, an ion exchanger operates to break down the mineral salts present in impure water through action with cation exchanges forming acids, the metallic elements of the salts being permanently linked with the cation resins. The acids are then removed by anion exchange resins which release only water.

Using this type of ion exchanger, which is comprised of a simple container having an inlet and outlet pipe and is filled with a cation resin to achieve the desired results, will increase the resistivity of the water to values as high as 13 megohms, as was previously mentioned.

Because the system is a closed one, it is not necessary to pass all the fluid flow through the ion exchanger to achieve good results. That is to say, if lower resistivities are useable, only a portion of the recirculating water need be passed through the ion exchanger whereby the average resistivity of all of the water in the system is appreciably increased, although not to the extremely high values achieved when all of the water is passed through the ion exchanger.

Accordingly, the primary object of my invention is to provide a novel closed cooling system utilizing water as a cooling medium for cooling electrical components at different potentials.

Another object of my invention is to utilize a recirculating water cooling system for electrical components which includes an ion exchanger for keeping the resistivity of the water at a high value.

Another object of my invention is to utilize water as a cooling medium for electrical components of different potentials wherein the water provides a direct connection between the electrical components and has its resistivity maintained at a high value by being recirculated through an ion exchange means.

These and other objects of my invention will become apparent from the following description when taken in connection with the drawings, in which:

Figure 1 shows my novel invention in a block diagram.

Figure 2 shows a second embodiment of my novel invention where only a portion of the cooling water is passed through an ion exchanger.

Figure 3 shows a three-phase half-wave rectifier system utilizing semi-conductor or metallic rectifiers which are cooled in accordance with the cooling system of my novel invention.

Figure 4 shows a cross-sectional view of one type of ion exchanger which can be utilized in accordance with my invention.

Referring now to Figure 1, it is seen that a closed water cooling system is constructed in accordance with my invention and includes a pump 10, an ion exchange unit 12, an electrical system 14 which includes components 16 and 18 therein and a water cooling means or heat exchanger 20.

The single solid and dotted lines of Figure 1 represent conduits for conducting the water cooling medium, these conduits being of the metallic type when connected to points of same potential and of the insulating type when being connected to components at different electrical potentials.

Thus, for example, the conduit connected to electrical components 16 and 18 will be of the insulated type so as to not form an electrical connection between these two elements which are at different potentials. Furthermore, the water cooling medium flowing within the conduit connecting elements 16 and 18 will not form an electrical connection therebetween in view of the ion exchanging unit 12 which maintains the resistivity of the water at extremely high values.

A second embodiment of my invention is shown in Figure 2 and includes the same elements 10 through 20, as set forth above in Figure 1.

The recirculation system, however, is altered in that the complete water flow is not passed through the ion exchange unit 12. That is to say, a valve device 22 sets up a minor flow path where a portion of the total water in the closed system is circulated through the ion exchange unit, while a major flow path includes the closed system of the pump 10, the electrical system 14 and the heat exchanger 20.

Clearly, however, a portion of the water taken in the major flow system will be that which has been previously circulated through the ion exchange unit 12 in the minor flow path so that the net resistivity of the water in the major flow path will be extremely high, although not as high as water which is completely circulated through an ion exchange unit.

A specific application of my invention is set forth in Figure 3 in conjunction with a three-phase half-wave rectifier unit utilizing semi-conductor rectifier elements.

As is well known, it is important to maintain semiconductor rectifiers as cool as possible so as to allow an appreciable current capacity for the rectifier elements without destruction thereof.

In the case of Figure 3, a rectifier transformer 24 is energized from a three-phase input line including conductors 26, 28 and 30. The secondary of rectifier transformer 24 is Y connected with its neutral being taken out as the negative D.-C. lead connected to terminal 32. Each of the rectifier phases is comprised of three parallel paths, each path comprising three series connected rectifier elements. Thus, in the upper phase of the rectifier branch it is seen that series connected rectifiers 34, 36 and 38 and series connected rectifiers 40, 42, 44 and series connected rectifiers 46, 48, 50 are connected in parallel with respect to one another. The positive side of each of the rectifiers 34, 40 and 46 are connected to a common bus bar 52 while rectifiers 36, 42 and 48 are connected to the bus bar 54, and rectifiers 38, 44 and 50 are connected to bus bar 56.

Each of the other phases of the rectifier system are connected in an identical manner as shown in Figure 3, and each of the bus bars, such as 52 for the upper phase, 58 for the middle phase and 60 for the lower phase, are connected together and to the positive rectifier output terminal 62.

In order to cool each of the rectifier elements of Figure 3, a recirculating water system constructed in accordance with my invention is utilized, the cooling water being forced through openings in the various buses, such as buses 52, 54 and 56.

The cooling system of Figure 3 includes a pump 64, an ion exchanger 66 and a heat exchanger 68.

The ion exchanger may be of the type set forth in Figure 4 as comprising a tank 70 which contains a mixed bed demineralizer through which the cooling water flows, a water inlet conduit 72 and a water outlet conduit 74. If desired, a conductivity meter 76 may be connected in the outlet conduit 74 to monitor the water resistivity, ringing an alarm if necessary, when the resistivity falls below a predetermined value.

The outlet conduit 74 of Figure 3 is then connected to insulated tubes 78, 80 and 82 which lead into buses 52, 58 and 60 respectively for cooling thereof.

After passing through buses 52, 58 and 60 of Figure 3, insulating tubes 82, 84 and 86 respectively lead the cooling water to the buses to the right of buses 52, 58 and 60 (and at a different electrical potential) and finally the cooling water is passed through the right hand buses by insulated tubing 88, 90 and 92 and discharged into the return conduit 94. Clearly, since the water has an extremely high resistivity of the order of megohms per cubic centimeter, there will be substantially zero current flow between points of different potential which are connected by means of the water path.

The water is thereafter recirculated through heat exchanger 68, pump 64 and ion exchanger 66 to be used once again.

While the above example of the application of my invention is given for a rectifier device, it is clear it could be applied to any type of electrical rectifying equipment such as mercury arc rectifiers, or, in general, to any type of electrical system having a closed cooling system.

Although I have described preferred embodiments of my novel invention, many variations and modifications will now be obvious to those skilled in the art, and I prefer therefore to be limited not by the specific disclosure herein but only by the appended claims.

I claim:

1. A recirculating water cooling system for electrical equipment; said recirculating water cooling system forming a closed system including at least, a circulating means for circulating water, a heat exchange means, said electrical equipment and ion exchange means for maintaining the water resistivity at a substantially high value of the order of megohms per centimeter cube; said electrical equipment cooled by said closed system including at least a first and second electrically insulated body at a first and second potential in contact with said circulating water.

2. A recirculating water cooling system for electrical equipment wherein the cooling water forms an electrical connection between two different potentials in said electrical system; said water cooling system forming a closed system and including at least, a circulating means for circulating said cooling water, a heat exchange means for extracting heat from said cooling water, said electrical equipment and an ion exchange means for maintaining the resistivity of said water at a high value.

3. A recirculating water cooling system wherein the cooling water forms an electrical connection between bodies at different electrical potentials with respect to one another; said water cooling system including at least, a circulating means for circulating said cooling water, a heat exchange means for extracting heat from said cooling water, an ion exchange means for maintaining the resistivity of said water at a high value, and water conducting means for interconnecting said circulating means, said heat exchange means, said bodies at different electrical potentials with respect to one another, and said ion exchange means to have at least a portion of the water circulated by said circulating means pass through said ion exchange means.

4. A recirculating water cooling system for rectifier elements wherein said cooling water is passed through a first conducting member connected to one pole of a first rectifier element and a second conducting member connected to one pole of a second rectifier element; said first and second poles being at substantially different potentials with respect to one another during at least a portion of an A.-C. cycle; said cooling water forming an electrical path between said first and second conducting members; said water cooling system including at least a circulating means for circulating said cooling water, a heat exchange means for extracting heat from said cooling water, an ion exchange means for maintaining the resistivity of said water at a high value and water conducting means for interconnecting said circulating means, said heat exchange means, said first and second conducting members and said ion exchanger means to have at least a portion of the water circulated by said circulating means pass through said ion exchanger means.

5. A water cooling arrangement wherein the cooling water flows between bodies at different electrical potentials with respect to each other, said water cooling arrangement including a pump for moving said cooling water between said bodies and an ion exchange means for increasing the resistivity of said cooling water before it is passed between said bodies.

References Cited in the file of this patent

UNITED STATES PATENTS

| | | |
|---|---|---|
| 1,843,176 | Seitz | Feb. 2, 1932 |
| 1,932,991 | Seitz | Oct. 31, 1933 |
| 2,011,605 | Atherton | Aug. 20, 1935 |

FOREIGN PATENTS

| | | |
|---|---|---|
| 347,801 | Great Britain | May 7, 1931 |